July 23, 1946.    C. N. CARLSON    2,404,362
TRAILER HITCH
Filed Dec. 2, 1944    3 Sheets-Sheet 1
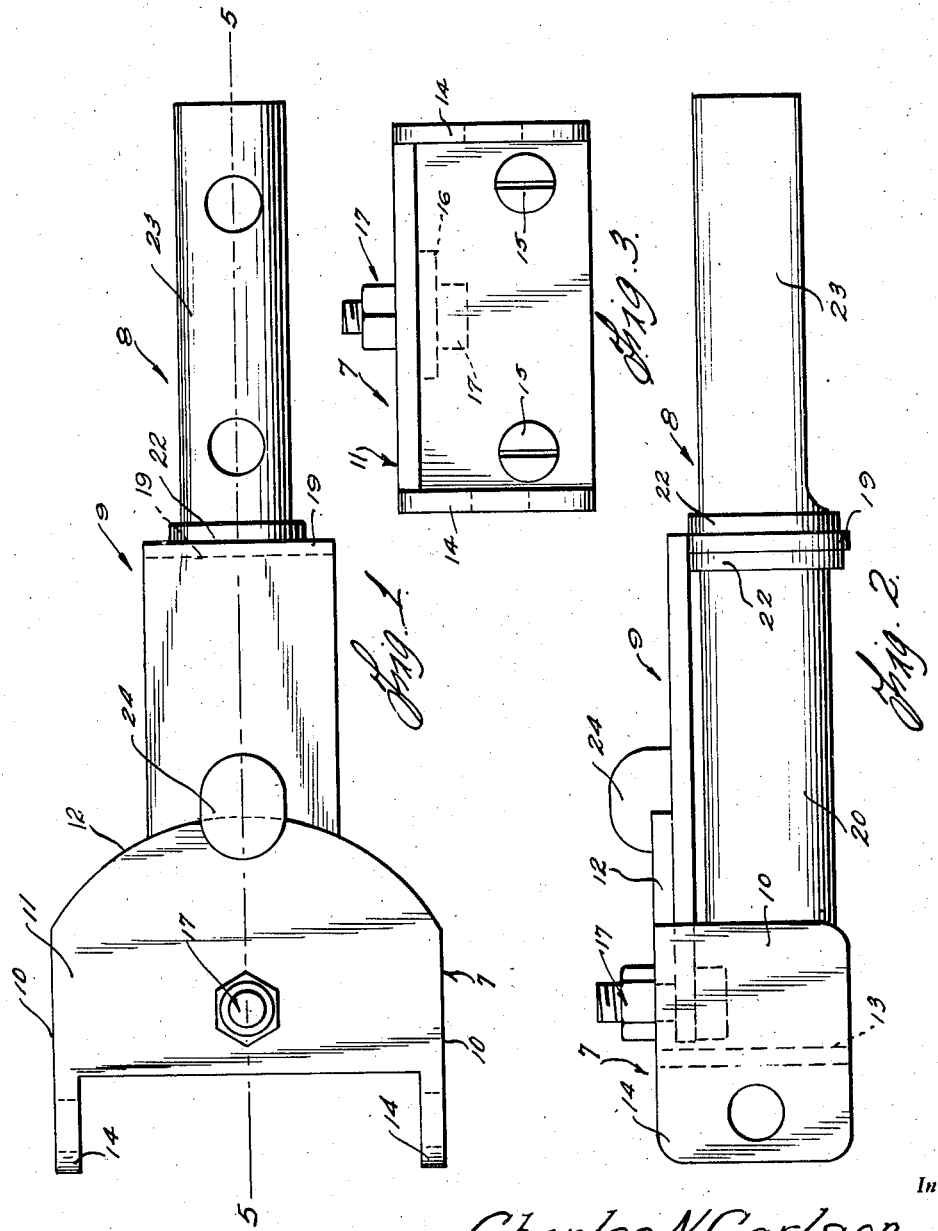
Inventor
Charles N. Carlson,
By Clarence A. O'Brien
and Harvey B. Jacobson
Attorneys July 23, 1946.    C. N. CARLSON    2,404,362
TRAILER HITCH
Filed Dec. 2, 1944        3 Sheets-Sheet 2
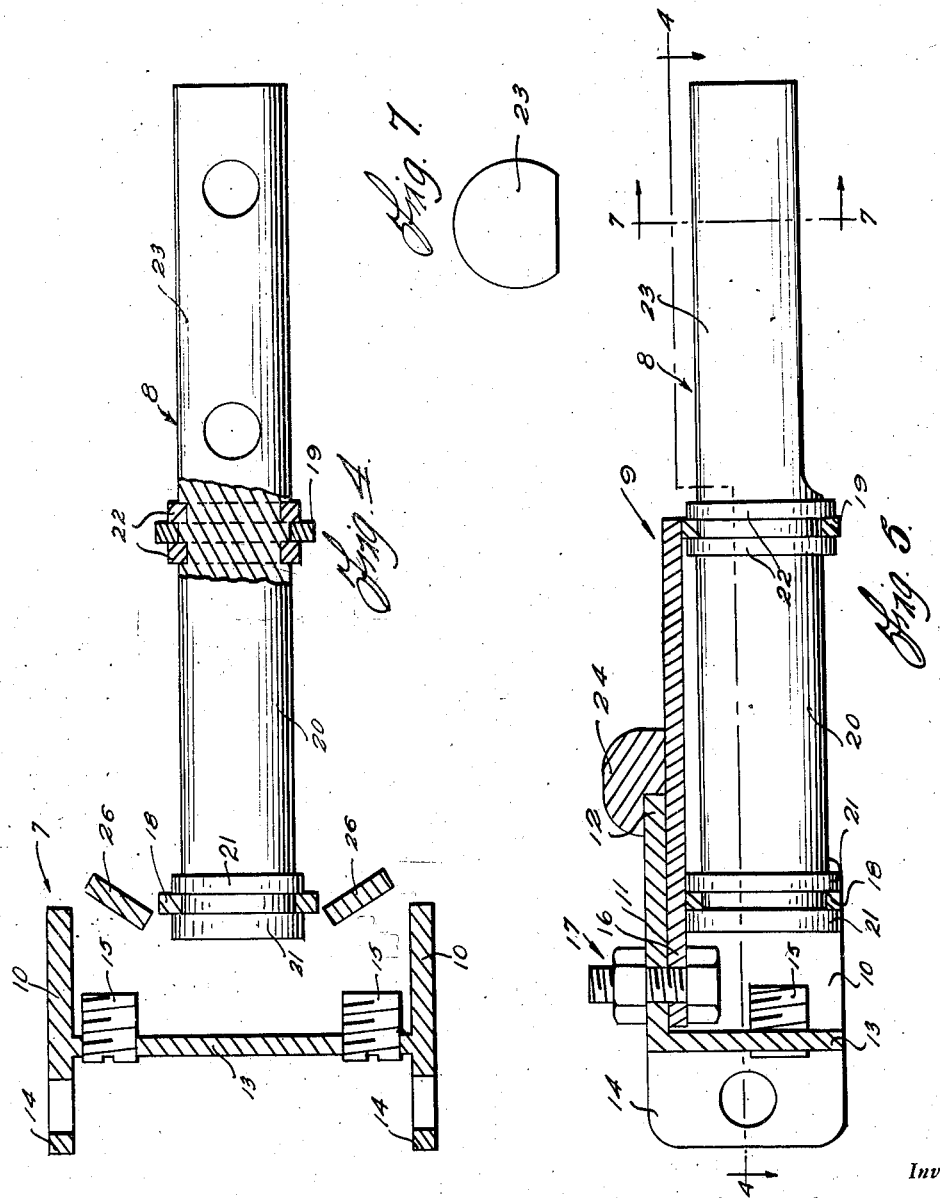
Inventor
Charles N. Carlson,
By Clarence A. O'Brien
and Harvey B. Jacobson
Attorneys July 23, 1946.  C. N. CARLSON  2,404,362
TRAILER HITCH
Filed Dec. 2, 1944   3 Sheets-Sheet 3
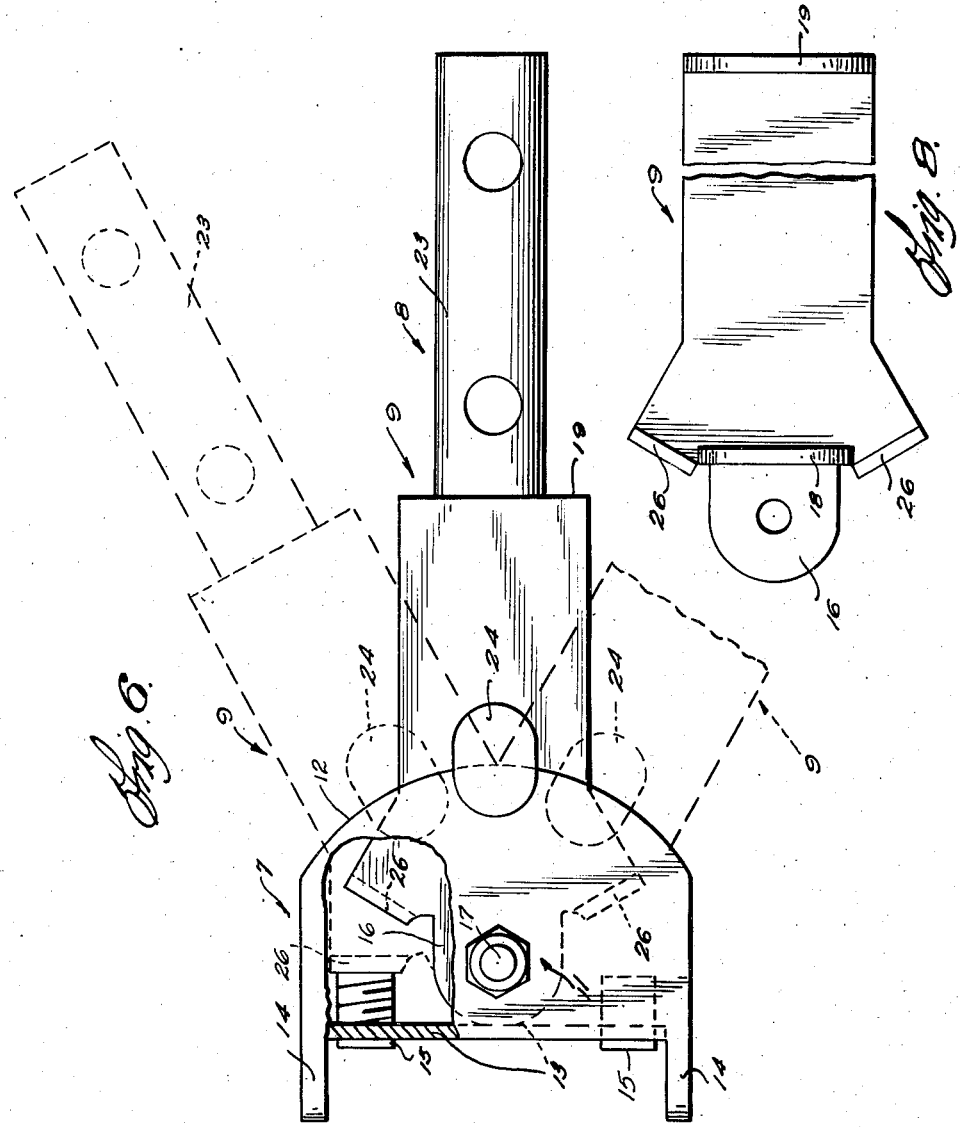
Inventor
Charles N. Carlson,
By Clarence A. O'Brien
and Harvey B. Jackson
Attorneys Patented July 23, 1946

2,404,362

UNITED STATES PATENT OFFICE 2,404,362

TRAILER HITCH

Charles N. Carlson, Glasgow, Mont., assignor of forty-five per cent to Albert L. Simpkins, Glasgow, Mont.

Application December 2, 1944, Serial No. 566,281

4 Claims. (Cl. 280—33.44)

This invention relates to vehicle couplings and so-called hitches and has more specific reference to one which is appropriately adapted to function as a substantially self-accommodating connection between a lead or powering vehicle and a companion trailer.

In bringing into practice the preferred principles of the instant invention I have conceived and adapted a well chosen arrangement of mechanical elements, these being so constructed and arranged as to provide a hitch which is highly adaptable in that it insures effectiveness of purpose and operation with a view toward accommodating road warp and other irregularities in contours and surfaces.

The trailer hitch forming the subject matter here under advisement is characterized by unusual simplicity in its construction and assemblage of the adopted parts, the over-all assemblage being possessed of strength, durability, reliability and low costs of production and use.

Other features and advantages will become more readily apparent from the following description and the accompanying illustrative drawings.

In the drawings, wherein like numerals are employed to designate like parts throughout the same:

Figure 1 is a top plan view of a trailer hitch constructed in accordance with the principles of the present invention.

Figure 2 is a side elevational view of the same.

Figure 3 is an end elevation, that is, a view observing either Figures 1 or 2 in a direction from left to right.

Figure 4 is a section taken approximately on the plane of the line 4—4 of Figure 5.

Figure 5 is a longitudinal sectional view taken approximately on the line 5—5 of Figure 1, and Figure 6 is a top plan view prepared to bring out, in a general way, the lateral swing of the horizontally swingable pivotally mounted parts.

Figure 7 is an end elevation of the tongue, this observing Figures 4 and 5 in a direction from right to left.

Figure 6 is a fragmentary bottom plan view of a part hereinafter referred to as a cradle-type coupler.

Referring to the general assemblage, it will be seen that it is characterized by an adapter attachment or supporting fixture 7, a trailer tongue or so-called pole 8 and an intervening coupler cradle 9.

Considering first the construction of the fixture 7 this is of hollow rectangular box-like form and embodies a pair of depending parallel side walls 10, a top wall 11 with an outstanding arcuate edged lip 12, a depending web or partition 13 between the side walls and a pair of outstanding ears 14, the latter suitably apertured for bolting or appropriate anchorage on the lead or powering vehicle (not shown). The web 13 is provided with a pair of adjustable set-screws 15 which serve as stops, in a manner hereinafter to be described.

The cradling coupler 9 is shown to advantage in Figure 5 and comprises a substantially U-shaped structure including a body portion 16 with its inner extended end underlying the roof or top of the fixture 7 and pivotally bolted thereto as indicated at 17. The bearing and cradling members, forming a part thereof, are denoted by the numerals 18 and 19, these being in longitudinal alignment and receiving the inner end or axle portion of the tongue 8. The so-called axle portion 20 is provided with assembling and retaining shoulders at spaced points as indicated at 21 and 22 which coact with the bearings, thus providing the desired axial swivel connection between the parts 8 and 9, respectively. This arrangement is such as to permit the trailer to accommodate itself to rocking from side to side, as is obvious. The outer end or extension 23 of the tongue is apertured so that it can be bolted on the trailer and the underside is flat to accommodate the platform or other part of the trailer. It follows that the fixture 7 is secured to the lead vehicle, the tongue or pole 8 is bolted to the trailer, and the coupler 9 affords an operating connection between said parts 7 and 8. As is evident, this coupler is provided with a hook-like lug 24 whose bill reaches and engages over the arcuately curved lip or flange portion 12 on the fixture 7. This provides the desired assembling of parts and permits the lateral sweep of tongue and coupler in relation to part 7 as shown in dotted lines in Figure 6. The inner end of the coupler unit is "fanned out" to be of substantial dove-tail form, the wing extension forming abutment 26 which engages with the stops 15. These stops are adjustable to provide for the desired nicety of horizontal side sway of the parts. By securing the fixture 7 to the lead vehicle and pivoting the coupler unit 9 thereon to swing back and forth in a horizontal plane and to regulate the extreme side to side movement and then by swivelling the pole 8 for axial cradling in the coupler, all necessary relative movements are provided to promote the desired factors of safety and reliability.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. As a new article of manufacture and as a component part of a trailer hitch of the class described, a fixture for attachment to a powering vehicle comprising a substantially rectangular box-like body embodying parallel side walls, a horizontal top wall, and an intervening partition between the side walls depending from said top wall, said side walls having rear extensions apertured to provide attaching ears, the forward edge of the top wall being formed into an arcuate guiding and assembling flange, a bolt mounted on the top wall to accommodate a coupler unit, and adjustable stops carried by the partition.

2. As a new article of manufacture and as a component part of a trailer hitch of the class described, a fixture for attachment to a powering vehicle comprising a substantially rectangular box-like body embodying parallel side walls, a horizontal top wall, and an intervening partition between the side walls depending from said top wall, said side walls having rear extensions apertured to provide attaching ears, the forward edge of the top wall being formed into an arcuate guiding and assembling flange, a bolt mounted on the top wall to accommodate a coupler unit, adjustable stops carried by the partition, a trailer pole having an axle at its inner end, a substantially U-shaped coupler and cradling unit, said unit being connected with the aforementioned bolt and swingably underlying the top wall, and said unit having depending end portions apertured and constituting bearings, said axle being journaled for rotation in said bearings.

3. As a component part of an assemblage of the class described, a substantially U-shaped coupler and cradling unit having diverging abutments at its inner end and having its opposite depending end portions fashioned into bearings, a trailer pole having an axle on its inner end mounted for oscillation in said bearing, the opposite end of the pole being adapted for connection to a trailer, said U-shaped coupler unit having at its inner end a pair of diverging portions terminating in abutments, and said abutments being adapted to swing in arcuate paths.

4. As a component part of an assemblage of the class described and as a new article of manufacture, an especially designed coupler and tongue or pole-cradling unit comprising a substantially U-shaped member including a plate-like body portion with an apertured extension constituting an ear, said ear being adapted for pivotal connection with a supporting fixture, the depending opposite end portions being apertured and in longitudinal alignment with each other and constituting spaced bearings to accommodate an axle portion of the aforementioned pole, there being a pair of outstanding diverging wing-like portions on opposite sides of said apertured ear and these having laterally bent terminals and said terminals constituting abutments, and a lug formed on the central top portion, said lug having a hook and said hook being adapted for coaction with the aforementioned supporting fixture.

CHARLES N. CARLSON.